(12) United States Patent
Takori et al.

(10) Patent No.: US 11,524,628 B2
(45) Date of Patent: Dec. 13, 2022

(54) NOTIFICATION DEVICE IN VEHICLE

(71) Applicants: HONDA MOTOR CO., LTD., Tokyo (JP); STANLEY ELECTRIC CO., LTD., Tokyo (JP)

(72) Inventors: Masayoshi Takori, Wako (JP); Miho Sasaki, Wako (JP); Yuji Tsuchiya, Wako (JP); Yuri Mitomo, Tokyo (JP); Tomohiro Kaneko, Tokyo (JP); Shota Suzuki, Tokyo (JP); Miyoko Nagaike, Tokyo (JP)

(73) Assignees: HONDA MOTOR CO., LTD., Tokyo (JP); STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/211,083

(22) Filed: Mar. 24, 2021

(65) Prior Publication Data
US 2021/0300239 A1    Sep. 30, 2021

(30) Foreign Application Priority Data

Mar. 27, 2020    (JP) .............................. JP2020-059014

(51) Int. Cl.
*B60Q 1/50*    (2006.01)
*B60Q 1/26*    (2006.01)

(52) U.S. Cl.
CPC .............. *B60Q 1/50* (2013.01); *B60Q 1/268* (2013.01)

(58) Field of Classification Search
CPC ................................... B60Q 1/50; B60Q 1/268
USPC .................. 340/463, 468, 471, 475
See application file for complete search history.

(56) References Cited

U.S. PATENT DOCUMENTS

| 3,665,392 A * | 5/1972 | Annas ...................... B60Q 1/26 340/479 |
| 4,591,954 A * | 5/1986 | Kawamura ............ B60Q 1/302 340/815.45 |
| 5,255,165 A * | 10/1993 | Cail ........................ B60Q 1/442 362/249.01 |
| 5,798,691 A * | 8/1998 | Tim Kao ............. B60Q 1/2661 340/479 |
| 6,443,573 B2 * | 9/2002 | Aoki .................... G03B 21/006 345/7 |

(Continued)

FOREIGN PATENT DOCUMENTS

JP    2014-234130 A    12/2014

*Primary Examiner* — Eric Blount
(74) *Attorney, Agent, or Firm* — Squire Patton Boggs (US) LLP

(57) ABSTRACT

A notification device in a vehicle enables a person outside the vehicle to be notified of a predetermined operating state of the vehicle by the light emission, and includes: a plurality of spot-shaped light sources arranged at intervals to follow an upper edge of a windshield; a reflecting part reflecting light from the light sources to a front; an outer lens transmitting therethrough the light heading toward the front from the reflecting part; and a housing. The outer lens has on at least one of front and rear faces thereof a fine concave-convex face diffusing the light transmitted through the outer lens. Accordingly, the device is visible through an upper part of the windshield from a person outside the vehicle so that visibility is very good, and the light from the relatively small spot-shaped light source can be sufficiently diffused so that visibility can be further enhanced.

8 Claims, 6 Drawing Sheets

(56) References Cited

U.S. PATENT DOCUMENTS

| | | | | |
|---|---|---|---|---|
| 6,511,216 | B2* | 1/2003 | Strickland | B60Q 1/2611 362/542 |
| 6,864,787 | B1* | 3/2005 | Veach | B60Q 1/442 340/468 |
| 7,036,965 | B2* | 5/2006 | Dalton, Jr. | B60Q 1/268 362/240 |
| 7,106,185 | B1* | 9/2006 | Neufeglise | B60Q 1/2611 340/468 |
| 7,478,492 | B2* | 1/2009 | Madonia | B60K 35/00 40/591 |
| 7,804,420 | B2* | 9/2010 | Girouard | B60Q 1/302 340/815.4 |
| 8,457,130 | B2* | 6/2013 | Kumar | H04L 69/40 370/394 |
| 9,165,460 | B2* | 10/2015 | Aziz | B60Q 1/525 |
| 9,365,153 | B2* | 6/2016 | Davis | B60Q 1/52 |
| 9,442,888 | B2* | 9/2016 | Stanfield | F02N 11/0807 |
| 9,925,915 | B2* | 3/2018 | Bauerle | B60Q 1/2696 |
| 10,227,034 | B2* | 3/2019 | Litke | B60Q 1/2615 |
| 10,252,665 | B2* | 4/2019 | Sturmat | B60Q 3/14 |
| 10,883,695 | B2* | 1/2021 | Belitz | B60Q 1/268 |
| 10,981,496 | B2* | 4/2021 | Schaye | B60Q 1/2603 |
| 2010/0033982 | A1* | 2/2010 | Yeh | B60Q 1/302 362/487 |
| 2015/0228869 | A1* | 8/2015 | Yoo | H01L 33/504 362/97.3 |
| 2017/0088039 | A1* | 3/2017 | Williams | B60Q 1/50 |
| 2019/0217768 | A1* | 7/2019 | Yoon | B60Q 1/2696 |
| 2020/0023769 | A1* | 1/2020 | Yi | B60Q 1/0035 |

\* cited by examiner

IN STANDBY

WHEN AUTOMOBILE MOVES AND ARRIVES AT SIDE OF OCCUPANT OUTSIDE VEHICLE IN RESPONSE TO CALL BY SMARTPHONE.

WHEN OCCUPANT OUTSIDE VEHICLE GETS IN AUTOMOBILE AND AUTOMOBILE IS ABOUT TO START MOVING.

AT TIME OF STARTING MOVING

DURING SELF-DRIVING AFTER STARTING MOVING

NOTIFICATION DEVICE IN VEHICLE

CROSS REFERENCE TO RELATED APPLICATIONS

The present application claims priority under 35 U.S.C. § 119 to Japanese Patent Application No. 2020-59014 filed Mar. 27, 2020 the entire contents of which are hereby incorporated by reference.

BACKGROUND OF THE INVENTION

Field of the Invention

The present invention relates to a notification device in a vehicle, which is mounted on the vehicle such as an automobile and enables a person outside the vehicle to be notified of a predetermined operating state of the vehicle by the light emission.

Description of the Related Art

An arrangement in which the notification device is disposed in a front end part of an automobile, for example, in a headlight part or a front grill part is conventionally known, as shown in Japanese Patent Application Laid-open No. 2014-234130.

In the arrangement of Japanese Patent Application Laid-open No. 2014-234130, since the notification device is disposed in a headlight part or a front grill part of the vehicle, that is, in a part that is exposed to wind and rain and that is at a relatively low position (for example, compared with a windshield upper part), not only is it necessary to take sufficient measures to make it waterproof, but it is also disadvantageous in terms of the visibility for a person outside the vehicle being enhanced.

SUMMARY OF THE INVENTION

The present invention has been accomplished in light of the above circumstances, and it is an object thereof to provide a notification device in a vehicle that can solve the above conventional problems.

In order to achieve the object, according to a first aspect of the present invention, there is provided a notification device in a vehicle, which emits light in a linear shape along an upper edge of a windshield, is visible through the windshield from a front of the vehicle, and enables a person outside the vehicle to be notified of a predetermined operating state of the vehicle by the light emission, the notification device comprising a plurality of spot-shaped light sources arranged at intervals so as to follow the upper edge of the windshield, a reflecting part reflecting light from the light sources to the front, an outer lens transmitting therethrough the light heading toward the front from the reflecting part, and a housing supporting the light source, the reflecting part, and the outer lens, and the outer lens having on at least one of a front face and a rear face thereof a fine concave-convex face that diffuses the light transmitted through the outer lens.

In accordance with the first aspect, since the notification device, which can notify a person outside the vehicle of a predetermined operating state of the vehicle by emitting light, is arranged so as to emit light in a linear shape along the upper edge of the windshield and be visible through the windshield from the front of the vehicle, the light-emitting region of the notification device extends lengthwise in the left-right direction in an upper part of the windshield (that is, a relatively high position), and visibility for a person outside the vehicle is very good and, moreover, due to the notification device being disposed in a vehicle compartment it is unnecessary to take special measures to make it waterproof, thus simplifying the structure. Moreover, even though the plurality of spot-shaped light sources arranged at intervals along the upper edge of the windshield are used, since the outer lens of the notification device has the fine concave-convex face for diffusing light that is transmitted through the outer lens on at least one of the front face and the rear face, the light from the relatively small spot-shaped light source can be sufficiently diffused by the concave-convex face, and visibility can be further enhanced.

According to a second aspect of the present invention, in addition to the first aspect, the housing has a rear part and a front part, the rear part being fixed to a roof part of the vehicle and the front part being fixed to an upper inner face of the windshield.

In accordance with the second aspect, since the housing has its rear part fixed to the roof part of the vehicle and its front part fixed to the upper inner face of the windshield, it is possible to support the notification device stably by the use of the roof part and the windshield.

According to a third aspect of the present invention, in addition to the first or second aspect, the concave-convex face includes a laterally long knurled surface formed on either one of the front face and the rear face of the outer lens, and a textured surface formed on another one of the front face and the rear face of the outer lens.

In accordance with the third aspect, since the concave-convex face of the outer lens includes the laterally long knurled surface formed on either one of the front face and the rear face of the outer lens and the textured surface formed on the other one, by virtue of the light diffusing effect of the knurled surface and the textured surface, the light from the plurality of spot-shaped light sources arranged at intervals along the upper edge of the windshield can be sufficiently diffused both in the up-down and left-right directions, and the front face of the outer lens can be seen as if it were emitting light via a band-shaped face. It is therefore possible to ensure, while achieving a small size and simplification for the light source by the use of the relatively small spot-shaped light sources arranged at intervals on one straight line, that the band-shaped light-emitting region extends in the upper part of the windshield lengthwise along the upper edge thereof over a wide range, thereby further enhancing the visibility.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained by reference to the attached drawings.

A four-wheeled automobile V as a vehicle is arranged so that it is possible to switch between a manual driving mode and a self-driving mode at any time, and in particular when the self-driving mode is selected a self-driving function can be exhibited. This automobile V is equipped at least with: an electronic control unit C as a control device that is disposed in an appropriate place of the vehicle body and can correspond to either manual driving or self-driving; various types of sensors that detect various pieces of information, necessary for self-driving control, related to the automobile V and its surroundings (for example, subject vehicle position, road conditions, pedestrians, other vehicles, etc.); and an operating system for self-driving that can operate various types of drive devices necessary for controlling travel of the automobile V.

The electronic control unit C enables self-driving of the automobile V by outputting an operational command based on a detected signal of the sensors when the self-driving mode is selected, so as to control the operation of the operating system for self-driving. The automobile V is equipped with a communication device that enables bidirectional communication between itself and a portable terminal (for example, a smartphone, a remote control key, etc.) possessed by a person outside the vehicle, and the electronic control unit C can send and receive a signal to and from the portable terminal via the communication device.

The present embodiment is related to a notification device with which the self-drivable automobile V carries out notification of an alert, etc. to a person outside the vehicle (for example, a driver prior to getting into the vehicle, a pedestrian, a driver of another vehicle, etc.), whereas the self-driving technique is conventionally known. In the present specification, further explanation of the arrangement and function for self-driving control of the present embodiment is therefore omitted, and it is mainly the notification device that is explained.

Figure 1:
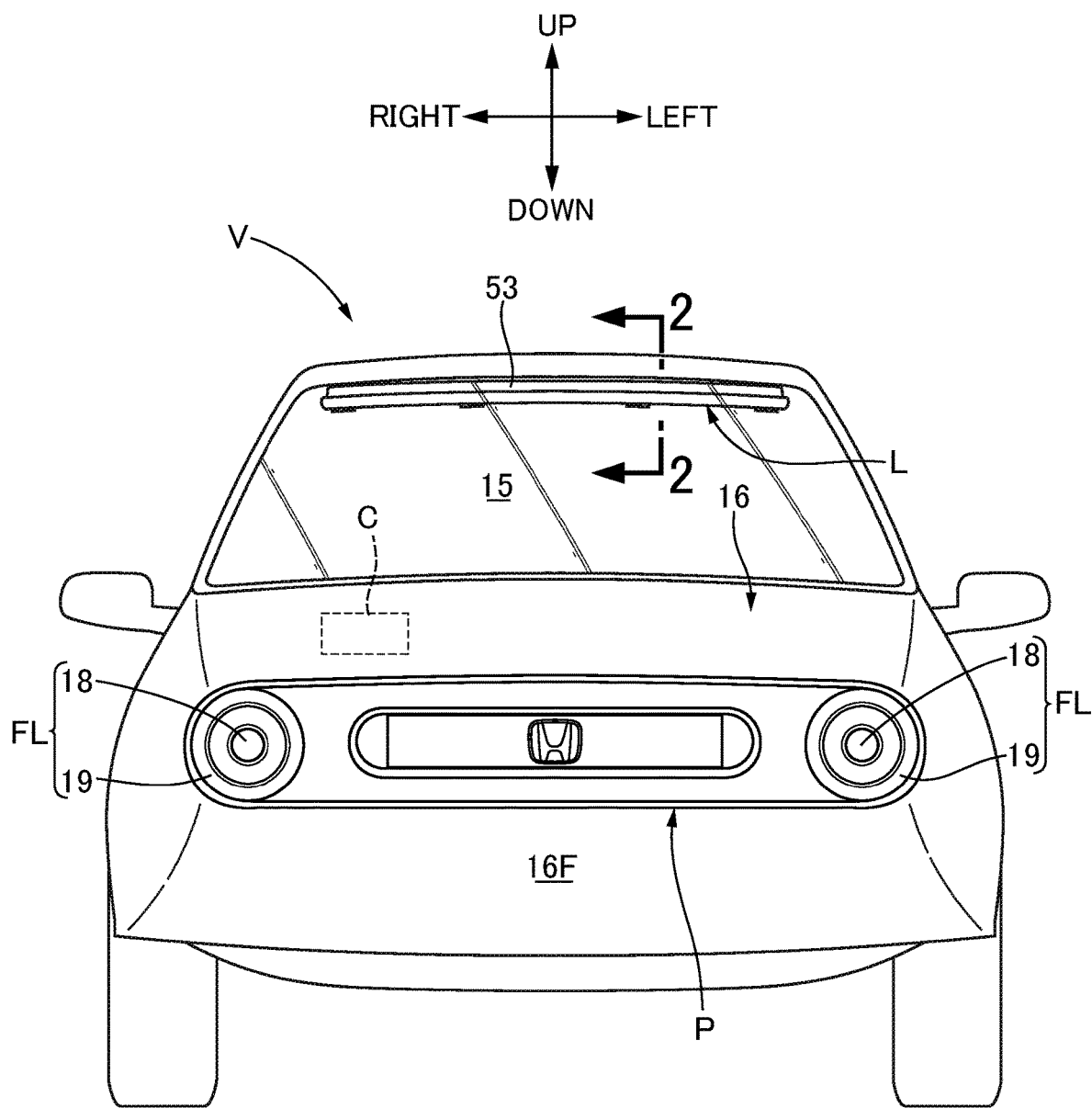
FIG. 1 is a front view showing one embodiment of an automobile in which the present invention is implemented.

The outline of a front structure of the automobile V is first explained by reference to FIG. 1.

Disposed in a front end part 16F of a front vehicle body 16 protruding forward from a vehicle compartment of the automobile V are a panel unit P extending in the vehicle width direction and a pair of left and right front combination light devices FL positioned on left and right end parts of the panel unit P. Each of the front combination light devices FL is formed by integrally uniting a headlight 18 and an auxiliary light 19 surrounding the headlight 18.

The four-wheeled automobile V of the present embodiment has a notification device L disposed in an upper part of a windshield 15 with a linear shape along an upper edge thereof as a notification device for notifying a person outside the vehicle of an alert, etc. according to the operating state of the vehicle.

Figure 2:
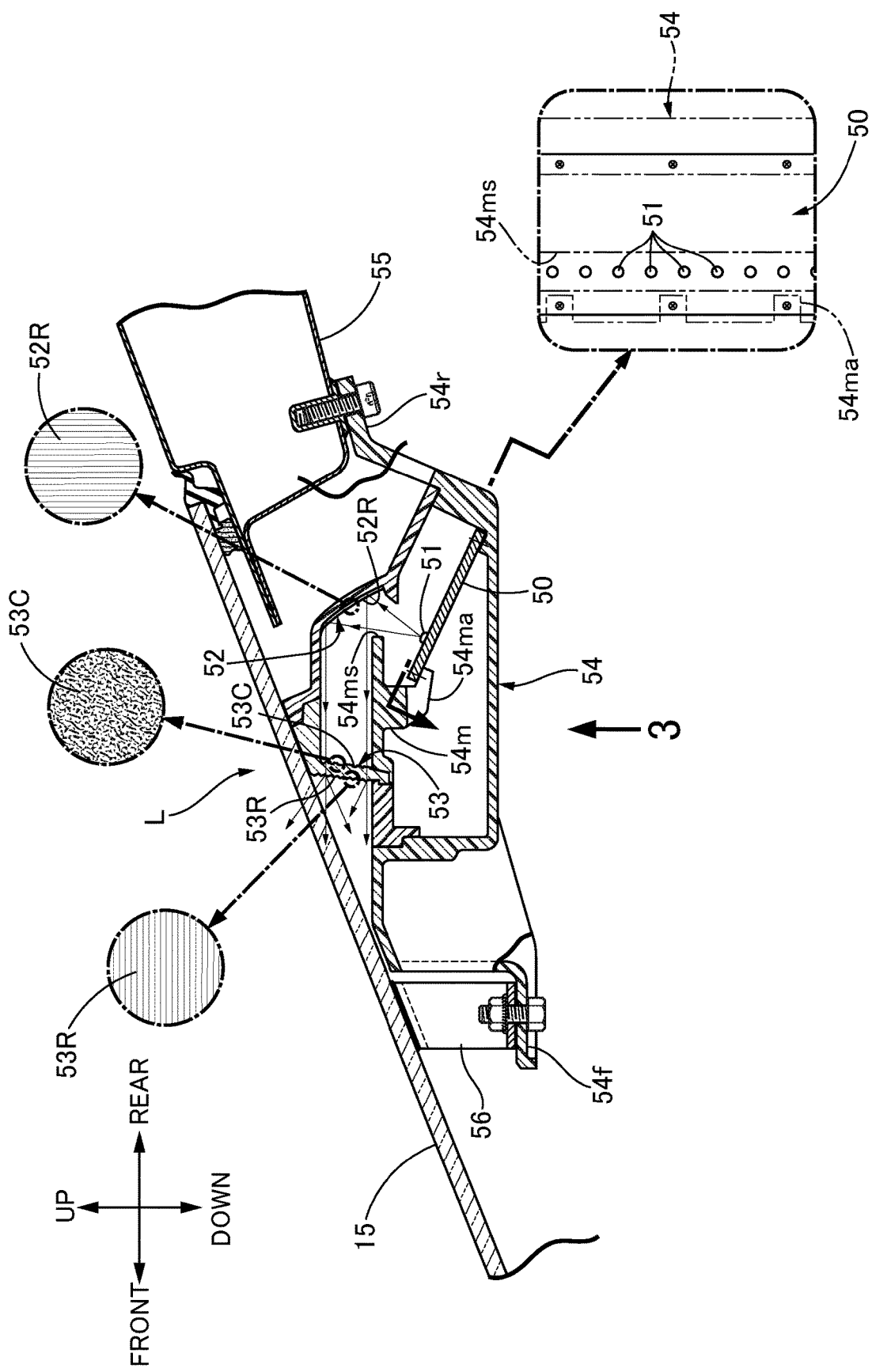
FIG. 2 is a longitudinal sectional view of a notification device and a peripheral part thereof (enlarged sectional view along line 2-2 in FIG. 1 and FIG. 3).
Figure 3:
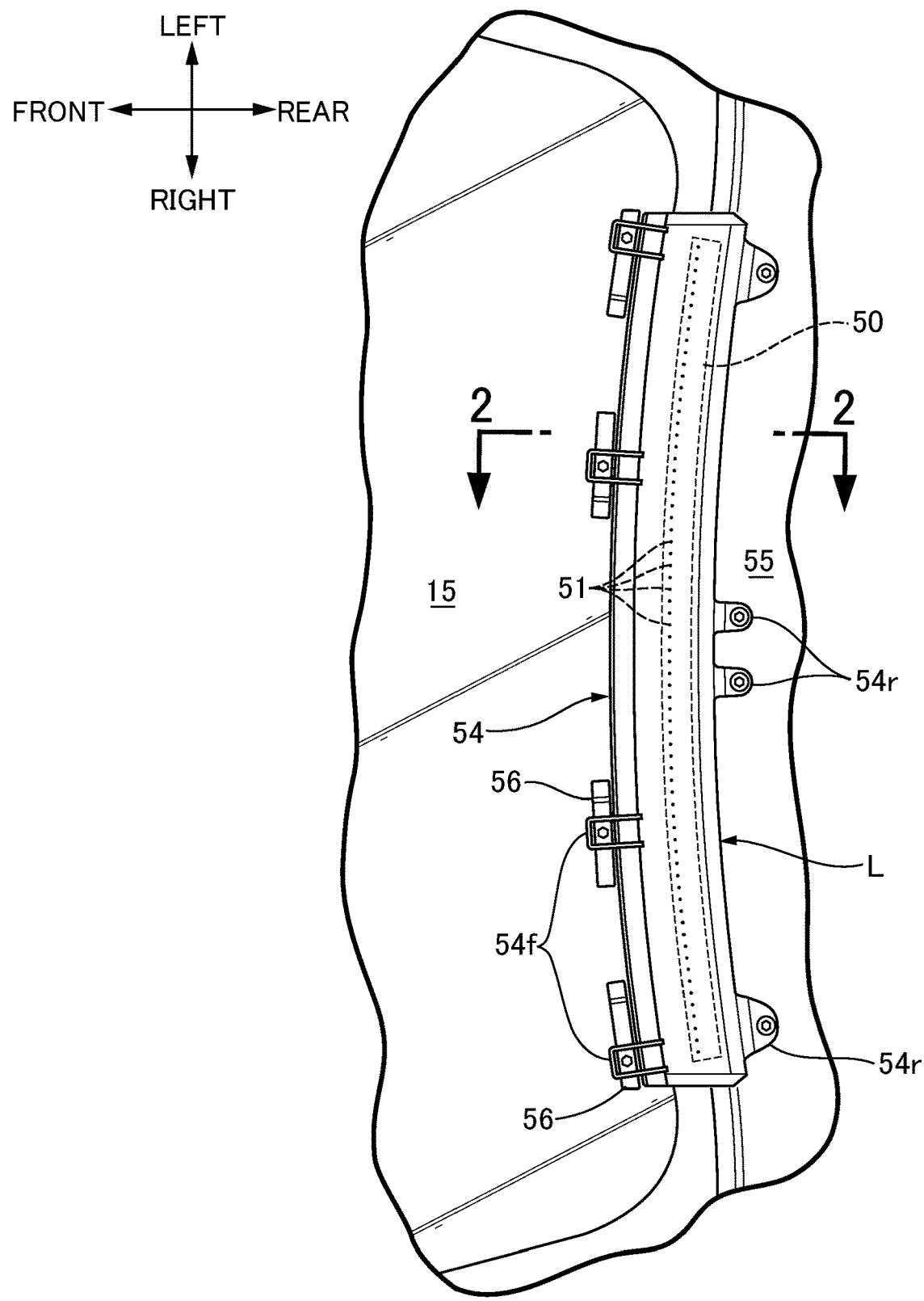
FIG. 3 is a bottom view of the notification device and a peripheral part thereof (view in the direction of arrow 3 in FIG. 2).
Figure 4:
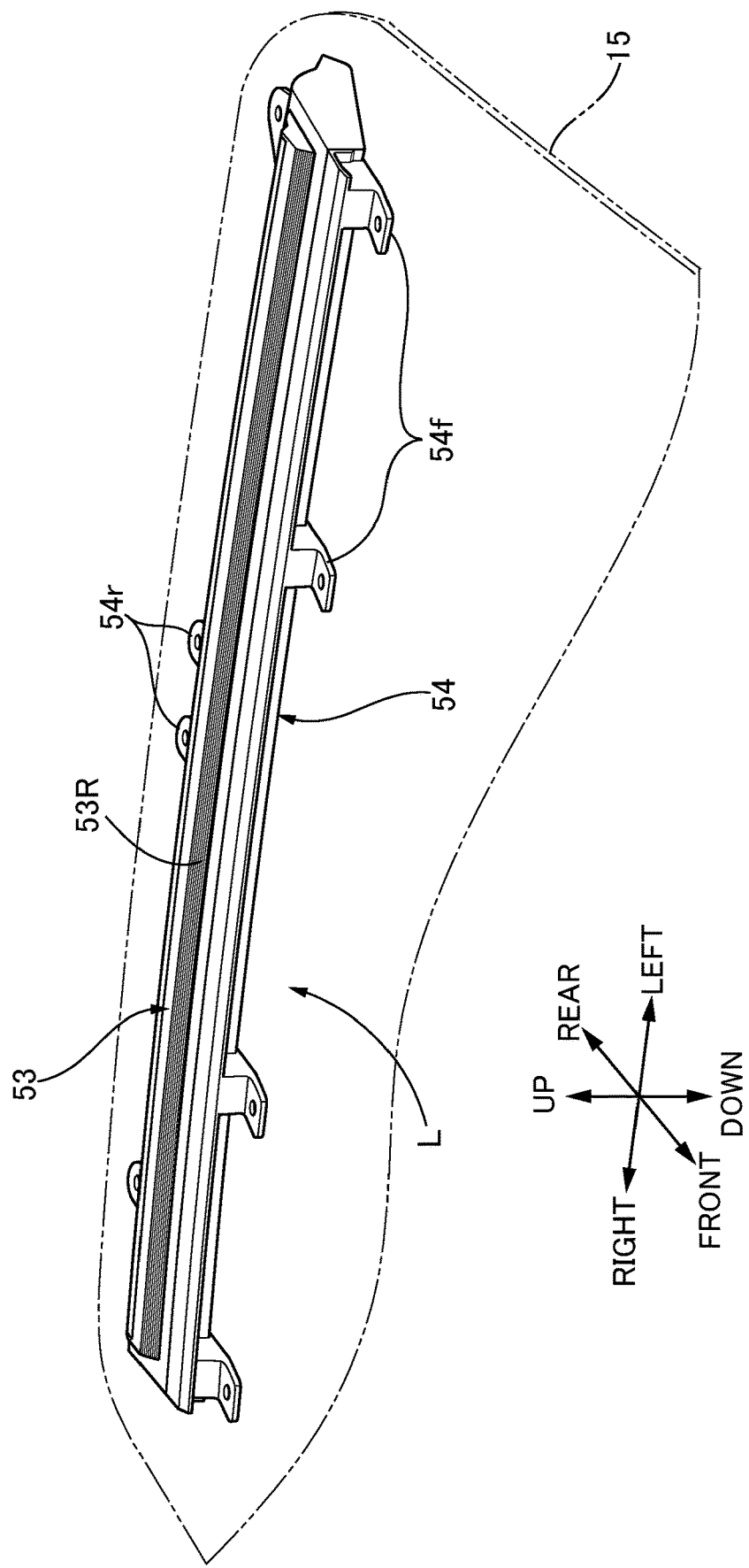
FIG. 4 is a perspective view of the notification device on its own viewed obliquely from above.

One example of the notification device L is now explained by reference in addition to FIG. 2 to FIG. 4.

This notification device L is arranged so that light is emitted in a linear shape along the upper edge of the windshield 15 so as to be visible through the windshield 15 from the front of the vehicle, and a person outside the vehicle can be notified by said emission of light that the vehicle is in a predetermined operating state (in the present embodiment, that it is self-driving).

This notification device L includes: a plurality of spot-shaped light sources 51 arranged in a line at intervals in the left-and-right direction on a band-shaped substrate 50 extending in the left-and-right direction; a reflecting part 52 reflecting forward the light from the light sources 51; an outer lens 53 transmitting therethrough the light heading forward from the reflecting part 52; and a housing 54 housing and supporting the light source 51—equipped band-shaped substrate 50, the reflecting part 52, and the outer lens 53. As the spot-shaped light source 51, a bead-shaped LED is used in the present embodiment.

The housing 54 is formed from a hollow case that extends lengthwise along the upper edge of the windshield 15 and is flattened in the up-down direction, and an intermediate wall 54m is formed integrally with an inner wall of the housing 54, the intermediate wall 54m partitioning the interior of the housing 54 in the up-down direction. Provided on the intermediate wall 54m is a substrate support portion 54ma and a slit 54ms that is narrow and long in the left-and-right direction, the band-shaped substrate 50 being fixed (for example, screwed) to the substrate support portion 54ma in an attitude inclined downward to the rear in cooperation with a lower wall of the housing 54, and the slit 54ms allowing the light heading upward and to the rear from the spot-shaped light source 51 on the substrate 50 toward the reflecting part 52 to pass through.

A plurality of rear stays 54r are integrally and connectedly provided on a rear end part of the housing 54, the rear stays 54r each being secured by bolting to a roof frame 55, as a roof part, that is part of the vehicle body of the automobile V, and a plurality of front stays 54f are integrally and connectedly provided on a front end part of the housing 54, the front stays 54f each being secured by bolting to a support piece 56 adhered to an upper inner face of the windshield 15. In this way, the rear part and the front part of the housing 54 (and consequently the notification device L) are fixed to the roof part of the automobile V and the upper inner face of the windshield 15 respectively.

The roof frame 55 and the upper edge part of the windshield 15 are water-tightly joined and fixed by conventionally known sealing means and joining means.

The outer lens 53 has a fine concave-convex face that diffuses transmitted light as at least one of its front face and rear face (both in the present embodiment). More specifically, the concave-convex face is formed from a laterally long knurled surface 53R formed on the front face of the outer lens 53 and a textured surface 53C formed on the rear face of the outer lens 53. The laterally long knurled surface 53R has a light diffusing function of diffusing mainly transmitted light mainly in the up-down direction, and the textured surface 53C has a light diffusing function of diffusing transmitted light in the up-down and left-right directions.

A fine concave-convex face that diffuses reflected light is provided on the reflecting face of the reflecting part 52, and in the present embodiment a longitudinally long knurled surface 52R having a strong effect of diffusing light mainly in the left-right direction is provided as the fine concave-convex face. Because of this, when the light from the spot-shaped light source 51 is reflected by the reflecting part 52, since it is sufficiently diffused (in the left-right direction in particular) and then heads toward the outer lens 53 it is possible, in synergy with the above light diffusing effect by the knurled surface 53R and the textured surface 53C of the outer lens 53, to sufficiently enhance the effect in diffusing the light emitting forward from the outer lens 53.

Each light source 51 of the notification device L is connected to the electronic control unit C via the band-shaped substrate 50 and wiring, which is not illustrated. While the automobile V is in self-driving mode, the electronic control unit C can control the light emission so that each light source 51 is continuously in a light-emitting state in order to make a person outside the vehicle (for example, a pedestrian, a driver of another vehicle, etc.) recognize and be alerted that it is in a self-driving state.

The operation of the embodiment is now explained.

The vehicle-mounted electronic control unit C stores in advance a control program for carrying out light emission control of the notification device L according to the operating state of the automobile V. As explained below, the electronic control unit C can control the notification device L so that the light-emitting mode changes according to the content of a notification when the automobile V is in a specific operating state in which notification to a person outside the vehicle should be carried out.

Figure 5A:
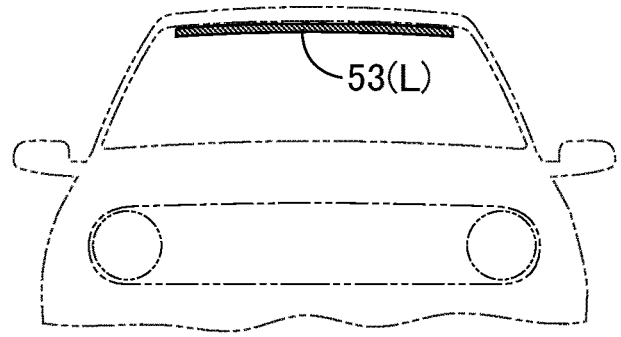
FIGS. 5A to 5C are front views of an essential part showing a control example of the notification device when an automobile in a standby state moves in response to a call by an occupant outside the vehicle, arrives at the side of the occupant, and subsequently is about to start moving.
Figure 5B:
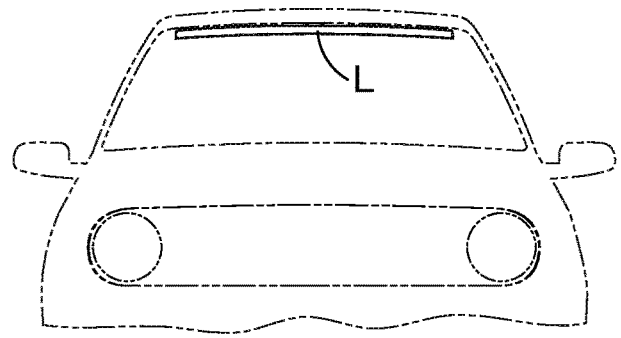
Figure 5C:
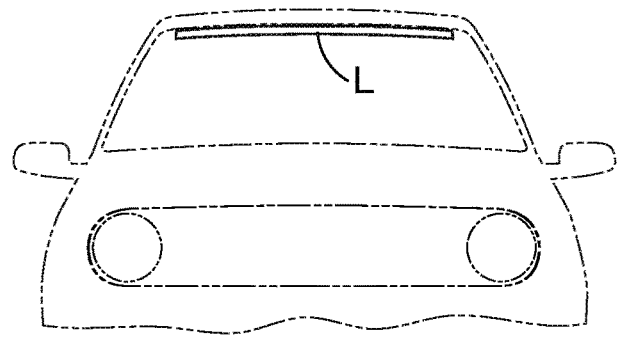

For example, the notification device L is put in a non-operating state, that is, a non-light-emitting state when the automobile V is in a standby stationary state (see FIG. 5A), and when in this state the electronic control unit C receives a call operation from a portable terminal (for example, a smartphone, etc.) of an occupant outside the vehicle, it immediately starts the light emission (see FIG. 5B) in response thereto. The light-emitting state continues without interruption until immediately before the automobile V controlled by the electronic control unit C moves to the side of an occupant outside the vehicle in response to the call operation and starts to move after the occupant gets into the automobile V (see FIG. 5C).

This enables an occupant outside the vehicle, a driver of another vehicle, a pedestrian, etc. to be notified and alerted that the automobile V is in an operating state in response to a call by the occupant outside the vehicle. When self-traveling is started so that the automobile V approaches the occupant outside the vehicle, the auxiliary light 19 thereafter continues to emit light in an annular shape as a daytime traveling light.

Figure 6A:
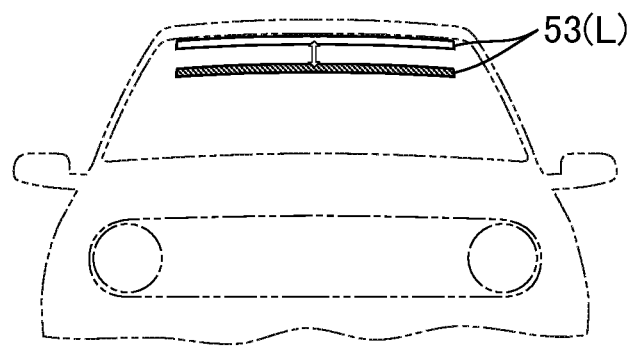
FIGS. 6A and 6B are front views of the essential part showing a control example of the notification device when the automobile starts moving and is self-traveling after starting.

Furthermore, the notification device L switches from the ongoing continuous light emission state to an intermittent light emission state (that is, a flashing state) as clearly shown in FIG. 6A when the automobile V arriving at the side of the occupant outside the vehicle starts to move after the occupant gets into the vehicle. In accordance with such a notification mode at the time of starting moving, the intention to start moving of the automobile V can be clearly conveyed to a third party so as to strongly alert them.

The notification mode at the time of starting moving as described above can be carried out all the time regardless of the conditions, but predetermined notification starting conditions may be prescribed.

With regard to the notification starting conditions, for example, it may be determined as a condition that there is no vehicle in front in a predetermined range in front of the automobile V, for example, within 6 m in front (and therefore there is no traffic jam, etc.) and there is a pedestrian as a subject to be notified in a predetermined range in front, for example, within a semicircle of 14 m in front within a predetermined time (for example, 1 sec before starting moving) before the automobile V actually starts moving in response to the starting travel operation by the occupant. If notification is started under such a starting condition, said notification is carried out only under circumstances in which notification is necessary in reality.

A condition for ending said notification at the time of starting moving can also be determined freely. For example, it may be determined such that notification is ended after a predetermined time (for example, 1 sec) has elapsed after the automobile V has actually started moving or after the automobile V has carried out a speed reduction.

End of notification by the notification device L during the starting process means that the intermittent light emission (that is, flashing) finishes and returns to continuous light emission.

Figure 6B:
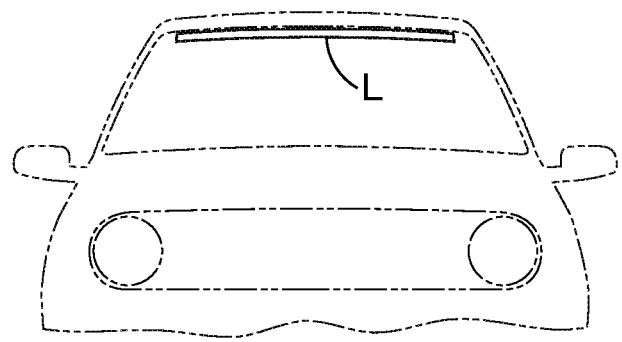

When the automobile V is in a normal traveling state by self-driving after starting moving, as clearly shown in FIG. 6B, by controlling the light emission of the notification device L so as to be continuous, a pedestrian or the driver of another vehicle is notified and alerted that the automobile V is self-driving.

Furthermore, the automobile V of the present embodiment is arranged so that the notification device L, which is capable of notifying, by light emission, a person outside the vehicle of the automobile V being in a predetermined operating state (in the embodiment that it is self-driving), emits light in a linear shape along the upper edge of the windshield 15 and is visible through the windshield 15 from the front of the vehicle. That is, the light-emitting region of the notification device L extends lengthwise in the left-right direction in an upper part of the windshield 15 (that is, a relatively high position), visibility for a person outside the vehicle is very good and, moreover, since the notification device L is disposed in a vehicle compartment, it is unnecessary to take special measures to make it waterproof, thus simplifying the structure.

Furthermore, in the notification device L the plurality of spot-shaped light sources 51 arranged at intervals so as to follow the upper edge of the windshield 15 are used, the light from the spot-shaped light sources 51 is reflected toward the outer lens 53 side while being diffused in the left-right direction by the reflecting part 52 having the longitudinally long knurled surface 52R, and it is subsequently transmitted through the outer lens 53 and radiated forward. In this case, since the outer lens 53 has the fine concave-convex face 53R or 53C for diffusing light on at least one of the front face and the rear face (both in the embodiment), the light from the small spot-shaped light source 51 can be sufficiently diffused by the concave-convex faces 53R, 53C, and visibility is good.

In particular, since the concave-convex faces of the outer lens 53 of the present embodiment are the laterally long knurled surface 53R and the textured surface 53C formed on the front face and the rear face respectively of the outer lens 53, by virtue of the light diffusing effect of the knurled surface 53R and the textured surface 53C, the light from the small spot-shaped light sources 51 arranged in a line at intervals along the upper edge of the windshield 15 can be sufficiently diffused both in the up-down and left-right directions, and a person outside the vehicle sees it as if the front face of the outer lens 53 were emitting light via a band-shaped face.

The notification device L can therefore ensure, while achieving a small size and simplification for the light source by the use of the small spot-shaped light sources 51 arranged at intervals on one straight line, that the band-shaped light-emitting region extends in the upper part of the windshield 15 lengthwise along the upper edge thereof over a wide range, thereby further enhancing the visibility.

Moreover, since the housing 54 of the notification device L has its rear part fixed to the roof frame 55 of the vehicle and its front part fixed to the upper inner face of the windshield 15, it is possible to support the housing 54 stably by the use of the roof part and the windshield 15 of the automobile V.

An embodiment of the present invention is explained above, but the present invention is not limited to the above-mentioned embodiment and may be modified in a variety of ways as long as the modifications do not depart from the gist of the present invention.

For example, the embodiment illustrates a control example, in which self-driving is carried out both in a call/movement stage in which the automobile V during standby moves to the vicinity of the occupant outside the vehicle in response to a call operation by the occupant outside the vehicle, and a start moving/traveling stage in which the automobile V subsequently starts moving and traveling with the occupant outside the vehicle getting in, but as a driving mode, self-driving may be carried out only in the call/movement stage and manual driving may be carried out in the start moving/traveling stage.

What is claimed is:

1. A notification device in a vehicle, which emits light in a linear shape along an upper edge of a windshield, is visible through the windshield from a front of the vehicle, and enables a person outside the vehicle to be notified of a predetermined operating state of the vehicle by the light emission, the notification device comprising
a plurality of spot-shaped light sources arranged at intervals on a substrate so as to follow the upper edge of the windshield,
a reflecting part reflecting light from the light sources to the front,
an outer lens transmitting therethrough the light heading toward the front from the reflecting part, and
a housing supporting the light sources, the reflecting part, and the outer lens, wherein the reflecting part is formed inside the housing to receive light from the light sources to forward the received light forwardly toward the outer lens, and
the outer lens having on at least one of a front face and a rear face thereof a fine concave-convex face that diffuses the light which is received from the reflecting part and transmitted through the outer lens,
wherein an intermediate wall is formed integrally with an inner wall of the housing and partitions an interior of the housing into an upper space and a lower space, and wherein
the intermediate wall is formed with a slit that extends in a lengthwise direction of the substrate to provide communication between the upper and lower spaces.

2. The notification device in a vehicle according to claim 1, wherein the housing has a rear part and a front part, the rear part being fixed to a roof part of the vehicle and the front part being fixed to an upper inner face of the windshield.

3. The notification device in a vehicle according to claim 1, wherein the concave-convex face includes a laterally long knurled surface formed on either one of the front face and the rear face of the outer lens, and a textured surface formed on another one of the front face and the rear face of the outer lens.

4. The notification device in a vehicle according to claim 2, wherein the concave-convex face includes a laterally long knurled surface formed on either one of the front face and the rear face of the outer lens, and a textured surface formed on another one of the front face and the rear face of the outer lens.

5. The notification device in a vehicle according to claim 1, wherein the light sources on the substrate are disposed in the lower space while the outer lens and the reflecting part are disposed in the upper space, the reflecting part receiving light from the light sources through the slit.

6. The notification device in a vehicle according to claim 1, wherein the reflecting part is formed with a fine concave-convex face on a reflecting face thereof.

7. The notification device in a vehicle according to claim 5, wherein the reflecting part is formed with a fine concave-convex face on a reflecting face thereof.

8. The notification device in a vehicle according to claim 5, wherein the slit is positioned to allow the light from the light sources to head upward and to a rear toward the reflecting part.

* * * * *